United States Patent
Slade et al.

(10) Patent No.: US 12,433,267 B2
(45) Date of Patent: Oct. 7, 2025

(54) EGG HARVESTING APPARATUS

(71) Applicant: ZYZZLE LIMITED, Reading (GB)

(72) Inventors: Glen Jonathan Slade, Surbiton (GB); Rafael Homem, Surbiton (GB); Michael Stallwood, Surbiton (GB)

(73) Assignee: ZYZZLE LIMITED, Reading (GB)

( * ) Notice: Subject to any disclaimer, the term of this patent is extended or adjusted under 35 U.S.C. 154(b) by 0 days.

(21) Appl. No.: 18/258,067

(22) PCT Filed: Dec. 14, 2021

(86) PCT No.: PCT/GB2021/053290
§ 371 (c)(1),
(2) Date: Jun. 16, 2023

(87) PCT Pub. No.: WO2022/129892
PCT Pub. Date: Jun. 23, 2022

(65) Prior Publication Data
US 2024/0032518 A1    Feb. 1, 2024

(30) Foreign Application Priority Data
Dec. 18, 2020 (GB) ..................................... 2020201

(51) Int. Cl.
*A01K 67/30* (2025.01)
(52) U.S. Cl.
CPC .................................. *A01K 67/30* (2025.01)
(58) Field of Classification Search
None
See application file for complete search history.

(56) References Cited

U.S. PATENT DOCUMENTS

| 8,776,721 | B1 | 7/2014 | Allen | |
| 9,510,572 | B2* | 12/2016 | Aldana | A01K 67/033 |
| 10,028,491 | B2* | 7/2018 | Massaro | B65G 35/04 |
| 11,470,820 | B2* | 10/2022 | Gaugler | A23K 20/158 |
| 11,602,124 | B2* | 3/2023 | Massaro | A01M 1/00 |
| 2006/0266292 | A1* | 11/2006 | Duckworth | A01K 1/0245 |
| | | | | 119/6.5 |
| 2017/0202191 | A1 | 7/2017 | Marchant et al. | |

(Continued)

FOREIGN PATENT DOCUMENTS

| CN | 105660540 A | 6/2016 |
| CN | 206491188 U | 9/2017 |

(Continued)

OTHER PUBLICATIONS

Search Report issued in GB2020201.6, dated Jun. 17, 2021.

(Continued)

*Primary Examiner* — Kimberly S Berona
*Assistant Examiner* — Nevena Aleksic
(74) *Attorney, Agent, or Firm* — Richard A Baker, Jr.

(57) ABSTRACT

An apparatus (1) with a container (2) for containing insects, a receiving member (200) upon which an insect in the container can lay an egg and an actuator (10) for removing the receiving member from the container once an egg has been laid upon the receiving member. The apparatus is for removing individual insect eggs from a container which contains many live insects. The individual eggs, once removed from the container, may be used in an individualized rearing process.

26 Claims, 9 Drawing Sheets

(56) References Cited

U.S. PATENT DOCUMENTS

| | | | | |
|---|---|---|---|---|
| 2017/0295758 | A1* | 10/2017 | Graves | A01K 39/0206 |
| 2018/0007874 | A1* | 1/2018 | Hall | A01K 7/02 |
| 2018/0077911 | A1 | 3/2018 | Massaro et al. | |
| 2018/0206473 | A1* | 7/2018 | Massaro | A01M 29/12 |
| 2019/0191678 | A1 | 6/2019 | Alrayya | |
| 2020/0008408 | A1 | 1/2020 | Jansen et al. | |
| 2021/0244015 | A1* | 8/2021 | Behling | B65D 47/06 |
| 2023/0404037 | A1* | 12/2023 | Santoro | A01K 29/005 |

FOREIGN PATENT DOCUMENTS

| | | |
|---|---|---|
| CN | 109714959 A | 5/2019 |
| CN | 210113965 U | 2/2020 |
| ES | 2018970 A6 | 5/1991 |
| JP | H0731331 A | 2/1995 |
| JP | H07155090 A | 6/1995 |
| JP | H11196710 A | 7/1999 |
| KR | 20010047446 A | 6/2001 |
| KR | 20100061037 A | 6/2010 |
| KR | 20110015340 A | 2/2011 |
| TW | I 692302 | 5/2020 |
| TW | 202023371 A | 7/2020 |
| WO | 2013166590 A1 | 11/2013 |
| WO | 2019008591 | 1/2019 |

OTHER PUBLICATIONS

Search Report issued in GB2020201.6, dated Feb. 11, 2022.
Dyck, Victor Arnold. "Rearing codling moth for the sterile insect technique." FAO plant production and protection paper 199 (2010).
China National Intellectual Property Administration (CNIPA), First Notification of Office Action for Application No. 202180083697.1, "Egg Harvesting Apparatus", Jun. 10, 2025 (English translation).

* cited by examiner

EGG HARVESTING APPARATUS

CROSS-REFERENCE TO RELATED PATENT APPLICATIONS

This is a U.S. National Phase Application under 35 U.S.C. § 371 of International Patent Application No. PCT/GB2021/053290, filed Dec. 14, 2021, and claims priority to GB Patent Application No. 2020201.6, filed Dec. 18, 2020, which is incorporated by reference in its entirety. The International Application was published on Jun. 23, 2020, as International Publication No. WO 2022/129892 A1.

The present invention relates to an apparatus for harvesting eggs, a method of harvesting eggs, pots for hatching eggs and methods of using the pots. More particularly the invention relates to apparatus, pots and methods for harvesting and hatching insect eggs.

It is desirable to rear insects individually in order to maximize yield and quality of an insect population. A high-quality population is useful for the sterile insect technique. In this technique, a reared population of insects is sterilised then released to compete with other insects. It is preferable that all members of the population to be released are well adapted to mating and competing with the existing population into which they are released. Individualized rearing is useful because it allows the conditions which each insect experiences to be varied according to the development of that specific insect. Since the rearing conditions, for example diet, light and temperature are independently tailored for each insect, an individually optimized population can be produced.

Individualized rearing preferably starts with an individual insect egg. The egg is isolated from other eggs, and the rearing process is begun.

One of the challenges in this process is how to seed each individual rearing pot with exactly one insect egg. To do this task manually is difficult and very labour intensive, yet manipulating eggs robotically is difficult due to their fragility and texture.

It is amongst the objects of the present invention to solve one or more of these problems.

In a first aspect the invention provides an apparatus for harvesting insect eggs, comprising;
  a container for containing an insect,
  a receiving member for receiving an egg laid by an insect,
  an actuator for removing the receiving member from the container.

The fact that the receiving member is removeable from the container allows the receiving member to be inspected individually to determine whether an egg has been laid on or in the receiving member. If an egg has been laid on or in the receiving member the egg can be removed and the receiving member can optionally be replaced into the container. Alternatively, the receiving member and egg can be taken away for further processing or development. The apparatus may be provided with a plurality of receiving members. The receiving members may be arranged in a series, for example a line of spaced apart receiving members. Preferably the receiving members are independently removable from the container by the actuator. This enables receiving members on or in which an egg has been laid to be removed, whilst leaving other receiving members inside the container to wait for an insect to lay an egg thereon/therein. If it is not clear whether an egg has been laid on or in a receiving member inside the container, only that receiving member may be removed for analysis. This allows an operator to leave other receiving members inside the container, to increase the chances that an insect in the container will lay an egg on or in the remaining receiving members. This provides an efficient harvesting process.

Preferably, as the receiving member is removed from the container, insects inside the container are not able to escape the container.

The actuator may be adapted to introduce the receiving member into the container. This is useful because a receiving member can be replaced into the container if no egg has been laid upon it.

The actuator may be adapted to remove the receiving member in a first orientation and move the receiving member into a second orientation. The movement may involve turning a receiving member upside-down.

The container may cooperate with both (or either of) the receiving member and the actuator as the receiving member is removed from the container, to ensure that any insects which are present in the container are prevented from escaping the container.

The container may be provided with a port,
  wherein the actuator is adapted to remove the receiving member from the container through the port,
  and wherein the port cooperates with the receiving member so that insects inside the container are unable to escape the container. This cooperation allows receiving members to be removed from the container whilst maintaining a population of insects inside the container.

The container may be provided with a port,
  wherein the actuator is adapted to remove the receiving member from the container through the port,
  and wherein the port cooperates with the actuator so that insects inside the container are unable to escape the container. This cooperation allows receiving members to be removed from the container whilst maintaining a population of insects inside the container.

The port may cooperate with both of the receiving member and the actuator such that, as the receiving member is removed from the container, any insects inside the container are unable to escape the container The port may be formed as a rigid aperture. This provides a defined boundary, which does not deform with respect to the actuator and/or receiving member. An accurate small distance between the edges of the aperture can therefore be maintained. This is useful for providing a consistent retention of insects in the container. It also provides an easily manufactured apparatus since it is convenient to provide a container with rigid walls.

The width of a gap between the port and a surface of the actuator and/or receiving member with which the port cooperates may be less than 1 mm, less than 0.5 mm and preferably less than 0.2 mm. These ranges are particularly preferred for adult insects such as moths, which cannot escape through such narrow gaps.

The port may be formed as a slit, wherein at least one wall of the slit is flexible. This can provide a sealing cooperation between the port and the receiving member and/or the actuator to prevent insects from escaping as the receiving member is removed from the container.

The receiving member may comprise a pot. This is useful when the insects to be held in the container require a diet to be held in the receiving member. One example of such an insect is the fruit fly Drosophila suzukii (spotted wing drosophila).

The receiving member may be recessed with respect to a surface of the actuator. This prevents eggs from being scraped off the receiving member (for example by the edge of an aperture or sealing means) as it is removed from the apparatus.

The receiving member may comprise a generally flat disc. The disc shape means that it is easy to locate the disc (for example on the actuator) without having to first orientate the disc. The flat nature of the disc provides an attractive egg laying site for many types of insect.

The surface area of the receiving member may be in the range of 1-250 mm$^2$ or 50-100 mm$^2$, and preferably is about 79 mm$^2$.

The receiving member may have a generally square, rectangular, oval or cross shape. The receiving member may be provided with grooves, ridges or other features which make parts of the receiving member more attractive for egg-laying, or help to localize an egg on the receiving member. Preferably these features are provided on a generally smooth laying surface. The features may be disposed centrally on the receiving member to encourage an insect to lay an egg centrally on the receiving member. This makes processing the egg easier.

The receiving member (or each of the plurality of receiving members) may be removably detachable from the rest of the apparatus. This allows the receiving member(s) to be taken away from the apparatus when each one has received an egg, for further processing.

The receiving member may be removably engageable with an engaging portion of the actuator. The engaging portion of the actuator may be a recess for accommodating the receiving member. The engaging portion provides a defined position on the actuator for the receiving member. This is useful if a plurality of receiving members are present on the actuator.

The receiving member may comprise a transparent portion. This is useful for identifying whether an egg has been laid on or in the receiving member. It is also useful if the receiving member is removeable from the apparatus such that it can form a lid of a container. A user can then see into the container to monitor whether an egg has hatched and monitor the development of an insect in the pot (which comprises the lid). This is particularly useful where an insect has a low fertility rate, since pots containing unhatched eggs can be emptied and recycled in a timely manner, without taking up unnecessary processing space for longer than they need to.

The apparatus may be provided with a plurality of receiving members which are independently removeable from the container. One or more receiving members may be removed from the container at the same time, whilst leaving one or more of the other receiving members inside the container to act as a site where an insect can lay an egg. This provides an efficient and fast process because receiving members are only removed from the container for monitoring. Egg laying opportunities on other receiving members are therefore maximized.

The actuator and the container may be adapted to rotate relative to one another. This is particularly useful when a plurality of receiving members are located on the actuator such that,
- as the actuator rotates relative to the container, the receiving members are moved from inside the container to outside the container and,
- as the actuator rotates further relative to the container, the receiving members are moved from outside the container to back inside the container.

This provides an efficient process of removal in which all receiving members spend generally equal amounts of time inside the container. It also provides a simple way of reintroducing receiving members back into the container once they have been monitored.

The actuator may comprise a rotating disc. This provides an efficient way of removing and returning receiving members to the container. Using a disc shaped actuator means that it is also easy to provide a single path which all of the receiving members follow as the rotation occurs. This is useful if the receiving members are to be monitored using a stationary detector.

The receiving members may be arranged in one or more rows. The rows may run generally parallel to an outer edge of the actuator. The outer edge of the actuator may correspond to the circumference of a circle. This provides a single path which all of the receiving members follow as the rotation occurs. This is useful if the receiving members are to be monitored using a stationary detector.

The apparatus may be provided with a motor for moving, for example rotating, the actuator. The motor may be a variable speed motor. This allows an operator to tailor the speed of the motor to correspond to the speed at which eggs are laid inside the container. The faster eggs are laid, the more frequently the actuator will need to be moved, e.g. rotated, to remove receiving members from the container.

The rotation of the actuator and the container relative to one another may be indexable. This is useful if a detector requires a specific amount of time in which to monitor a particular stationary receiving member. The actuator may be moved between indexed positions which correspond to positions of the receiving members relative to another portion of the apparatus, for example a detector or an interrupting device (discussed below). This ensures a fast rotation, whilst providing the necessary amount of stationary time in an accurate position to carry out an action on the receiving member.

The actuator may be adapted to remove more than one receiving member from the container at the same time. Batches of receiving members may be removed at once to speed up a monitoring (or other) process which is carried out outside of the container.

The apparatus may further comprise an automated detector for detecting whether an egg has been laid on a given receiving member. The apparatus may comprise more than one automated detector. One automated detector may be inside the container and another automated detector may be outside of the container. One automated detector may be arranged to detect the presence of an egg. Another automated detector may be arranged to detect the presence of an insect in the process of laying one or more eggs. The automated detector(s) may be a camera or cameras. The automated detector may be positioned so that it can monitor receiving members either inside or outside of the container, or both inside and outside the container. The automated detector(s) may be linked to a control unit. The control unit may communicate with another part of the apparatus, to send a signal based on a detection outcome to another part of the apparatus, for example a motor for moving the actuator, an intervention device, or a removal device (discussed below). This enables the other part of the apparatus to be actuated in response to a detection signal from the detector, for example, the signal may correspond to the presence or absence of one or more eggs, or the rate at which eggs are being laid in the container. When the signal depends on the rate of laying in the container, the signal may be sent to the motor to adjust the speed of movement of the actuator accordingly. A high rate of laying requires a faster removal of receiving members/eggs and corresponds to a faster speed of movement, for example rotation, of the actuator.

The apparatus may further comprise a device for adding water or diet to the receiving member in response to a signal from the automated detector.

The apparatus may further comprise an intervention device for preventing an insect from laying a second egg on a receiving member on which an egg has already been laid. The intervention device may be an air blower or a device such as a cover. The intervention device may be an automated system having an actuator which places a cover over a receiving member once an egg has been detected upon the receiving member. This prevents further eggs from being laid on the receiving member. This is useful because egg separation problems are avoided. The air blower may be directed towards a particular receiving member on which the detector detects that an insect is about to lay, or in the process of laying more than one egg. The air blower may deliver a blast of air in the direction of the insect detected by the detector to interrupt the insect's egg laying process. This is useful for some insects which lay large batches of eggs. Large batches of eggs are undesirable for individualized rearing processes. If the laying process can therefore be interrupted when the insect has only laid one egg, or as close to 1 egg as possible, the efficiency of the harvesting process is improved.

The intervention device may be adapted to interrupt an insect's egg laying process in response to a signal from an automated detector.

The container may be provided with a reclosable port for introducing insects into the container. The port may be provided with an insect-proof sleeve.

The container may be provided with a second reclosable port. The second reclosable port may be used for cleaning the inside of the container or suctioning insects out of the container. The second reclosable port may be formed as a hinged portion in a wall of the container. In some embodiments the whole of a wall of the container may be openable to provide access to the interior of the container. The second reclosable port may be a drainage aperture.

A portion of a wall of the container may be formed of a mesh. A portion of an interior surface of a wall of the container may be covered by a mesh. This is particularly useful for insects such as moths. Mesh deters insects such as moths from laying their eggs on the mesh. Increasing the amount of mesh, reduces preferred egg-laying spots for the insects and increases the chances that they will lay an egg on a receiving member. This improves the efficiency of the process.

Preferably the mesh comprises wires having a diameter 0.56 mm which are woven into a mesh leaving square holes of side length 1.56 mm. This is particularly useful for adult codling moths (Cydia pomonella) because they cannot escape through these holes and they are not inclined to lay eggs on the wires. Preferably the mesh holes have a side length of less than 2.5 mm. Preferably the diameter of the hole is as large as possible whilst still being small enough to stop a given insect from escaping. The mesh size may therefore be tailored to a given insect size.

A portion of (or the whole of) an interior surface of a wall of the container may be textured. Equally, a portion of (or the whole of) the actuator may be textured. The receiving members are generally formed with a generally smooth exposed surface. The textured nature usually means that the textured surface is rougher than a surface of the receiving member. The textured surfaces may be provided with ribs or other features which deter an insect from laying an egg on the textured surface.

Preferably 30%, 40%, 50%, 60%, 70%, 80% 90% or substantially all of the surface area of the surfaces inside the container, including the walls and actuator portions, (but excluding the receiving member or receiving members) may be covered with (or formed of) an insect egg laying deterrent feature as discussed herein, such as a textured (e.g. roughened or featured) surface or a mesh.

A laying surface of the receiving member may be smoother than a textured interior surface of a wall of the container. This encourages insects to preferentially lay an egg on the receiving member rather than on another interior surface of the container or actuator.

The receiving member may be provided with a recess for accommodating a diet for an insect. This is useful for insects such as fruit flies, which are attracted to lay eggs on or in a diet.

The receiving member may be provided with an insect attractant. This attractant could be a liquid which evaporates to become airborne and which attracts an insect. This increases the chances of an insect laying an egg on the receiving member.

The apparatus may further comprise a removal device for removing a receiving member from the actuator, and/or removing an egg from a receiving member. The apparatus may comprise a removal device for removing the receiving member, along with an egg, from an engaging portion on the actuator, with which the receiving member is engaged.

Preferably recesses (engaging portions) in the actuator which accommodate the receiving members have a depth which allows an upper surface of the receiving member (when engaged with the recess) to sit below a top surface of the actuator. This allows an egg located on the receiving member to sit below the top surface of the actuator. This prevents an egg from being scraped off the receiving member as the receiving member passes under a wall which defines an aperture (through which the receiving member is removed).

In a second aspect the invention provides a method of harvesting eggs comprising;
providing an apparatus as described herein,
introducing at least one female insect into the container,
detecting when the insect has laid an egg on the receiving member, and
actuating the actuator to remove the receiving member from the container.

Throughout this application, when it is stated that the egg is laid 'on' the receiving member, this wording is intended to encompass circumstances where the egg could be more accurately described as being laid 'in' a receiving member, for example when the receiving member is a pot or when the egg is deposited inside of a diet.

Preferably the step of introducing at least one female into the container comprises the introduction of at least, 1-12000 insects and preferably 1000-12000 insects into the container.

The method may further comprise the step of removing the receiving member and an egg from the apparatus and replacing it with a new receiving member. The actuator may introduce the new receiving member into the container.

The at least one female insect may be introduced into the container in a transport container, wherein the transport container is introduced into the container through a reclosable port in the container, which port is closed before the transport container is opened to release the insect therein. The transport container may serve as an inner container.

Preferably the transport container has a reclosable port for allowing insects within the transport container to access the receiving member(s). The transport container may otherwise have any of the characteristics described herein in connection with the (main) container, for example textured or mesh walls. This provides a convenient method of introducing live insects into the container, which is faster than methods in which insects need to develop in the container of the apparatus. The apparatus as described herein may be provided with a transport container as described above.

The at least one female insect may be a codling moth.

The at least one female insect may be a fruit fly. The method may further comprises the step of providing a diet for the fruit fly on the receiving member. The fruit fly may be spotted wing drosophila.

The method may further comprise the step of transferring the egg from the receiving member to a hatching container.

In a third aspect the invention provides a pot for hatching an insect egg, comprising;
a removeable lid,
a body having walls which define a volume for accommodating an insect egg and a diet for an insect,
wherein the removeable lid has any of the features of a receiving member as described herein, and
wherein the body is provided with a support for supporting the removeable lid.

In a fourth aspect the invention provides a pot for hatching an insect egg, comprising;
a body having walls which define a volume for accommodating an insect egg and a diet for an insect, and
a lid,
wherein the lid is provided with an aperture.

The aperture in the lid may be adapted to support a receiving member as described herein. For example the aperture may be circular. It may have a ledge which acts as a seat for the receiving member.

Preferably the volume of the pots according to the invention is between 5 µL and 20 mL and preferably between 60 µL and 2 mL. The lower bound of these ranges provide pots for holding suitable amounts of initial diet in which an insect can lay an egg. Further diet, for the insect to eat, may be provided throughout the life cycle of the insect. These volumes exclude space in the lid and chimney (see below). A volume of 60 µL is particularly useful for a spotted wing drosophila fruit fly. A volume of 2 mL is particularly useful for a codling moth.

The pot may further comprise a chimney which extends from the aperture in the lid. The chimney and the lid may be formed as a 1-piece arrangement. The chimney provides a volume to accommodate a larva of an insect, which volume is separate from a portion of the pot which is adapted to hold a diet for an insect. Preferably the chimney forms a generally cylindrical volume. Preferably the volume extends upwardly above the lid of the pot. Preferably the chimney is located centrally in the lid. The chimney preferably has the profile of a test tube, with generally cylindrical sides and an open lower end.

Preferably the lid of the pot is provided with an engaging means for engaging a chimney. The chimney is preferably provided with engaging means which engage with the engaging means on the pot. The engaging means on the pot and chimney may be a 'rib and groove' or a 'notch and lug' arrangement in which the rib or notch snap fits with a groove or lug. Preferably the chimney is removably engageable with the pot.

Preferably a portion of the lid, chimney, or pot body is transparent. This allows an operator, or an automated detector, to visually monitor the development of an insect in the pot or in the chimney.

Preferably the chimney has an elongate hollow body which defines a volume of between 200 µL and 700 µL.

In the apparatus according to the invention the receiving member may be a pot as described herein.

In a fifth aspect the invention provides a method of using a pot as described herein comprising the steps of;
providing a receiving member as described herein with an insect egg received thereon, and
engaging the receiving member with the support on the body or the aperture in the lid so that the egg is placed within the volume defined by the body.

Alternatively, the step of engaging the receiving member with the support on the body or the aperture in the lid is conducted so that, once the receiving member is engaged, the egg is positioned such that the larva is able to hatch from the egg and travel into the volume defined by the body.

The method may further comprise the step of adding a chimney to the pot before pupation of the insect.

Figure 7:
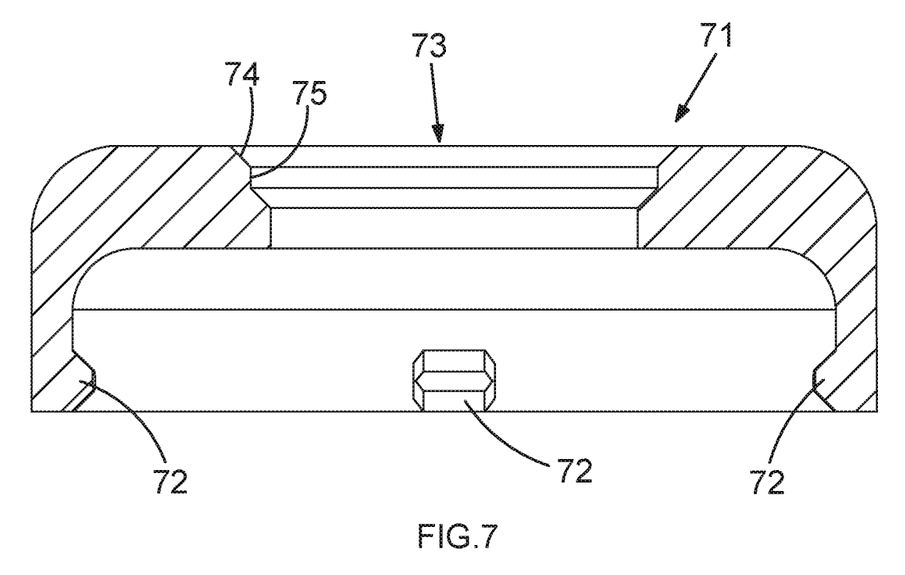
FIG. 7 shows a side cross sectional view of the lid of a pot according to the invention.

In methods according to the invention lids of the pots described herein may be exchanged for one another, depending on the stage of development of the insect. For example, the receiving member and the egg may be removed from the pot and replaced with a solid lid (i.e. one without an aperture), after the egg has hatched. This prevents a larva from potentially escaping from the pot as it becomes more mobile. This also delays adding the chimney to the pot, which requires a larger volume of storage space. One may then swap the solid lid for a lid provided with a chimney (as described herein) before pupation of the insect. The aperture may be designed to receive more than one of; a chimney, a plug and a receiving member. For example, the aperture of a lid could be provided with a groove arrangement from FIG. 8 for accommodating a chimney and also the shelf arrangement from FIG. 7 for accommodating a receiving member or plug. The plug may secure to the lid in the same way as the chimney shown in FIGS. 8 and 10. In that case, a receiving member which forms a lid as shown in FIG. 7 (by sitting in the aperture) may be left in situ in the lid's aperture when/whilst the plug is fitted.

Non-limiting embodiments of the invention will now be described with reference to the figures of the drawings, in which.

Figure 1:
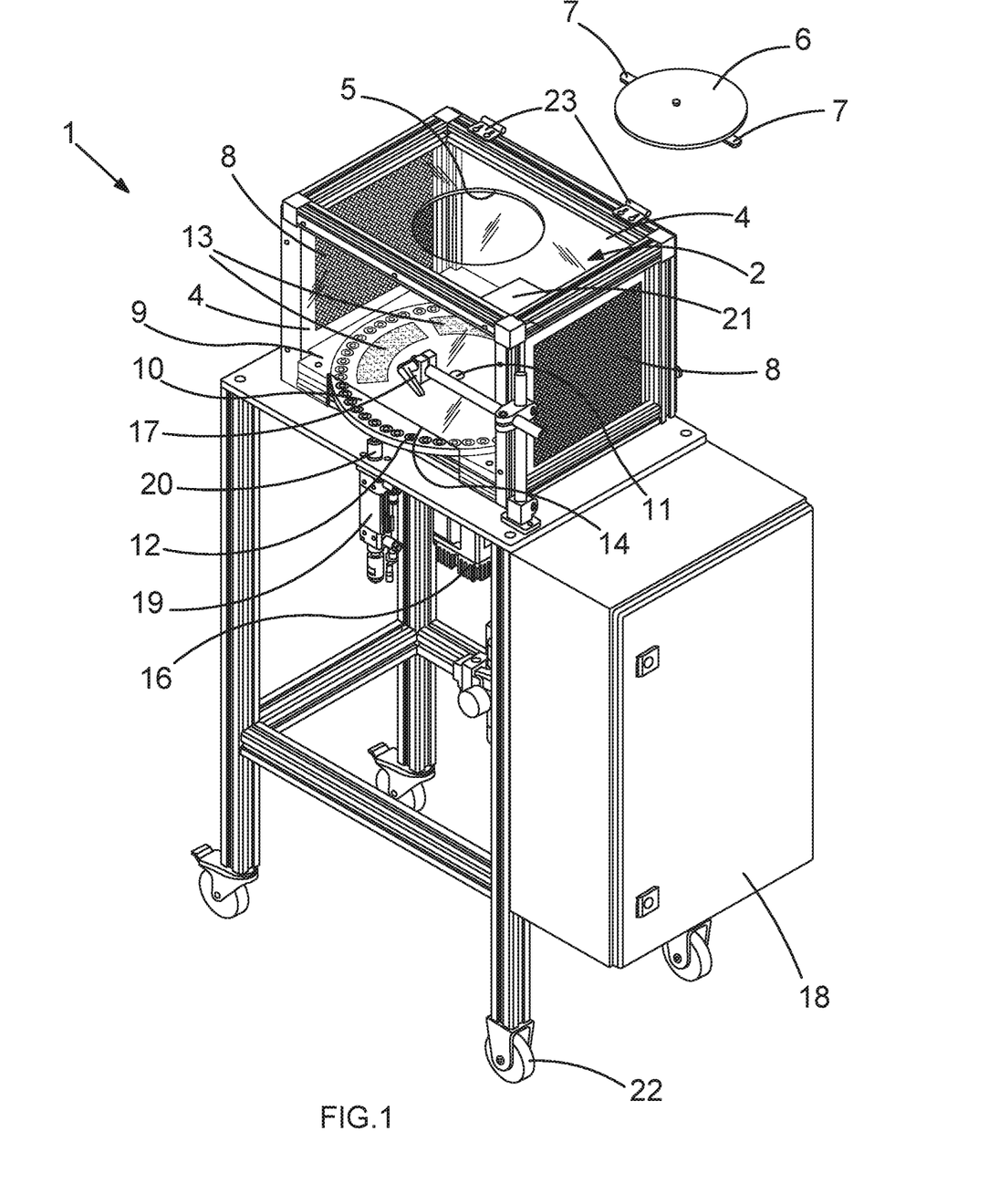
FIG. 1 shows a perspective view of an apparatus according to the invention.
Figure 2:
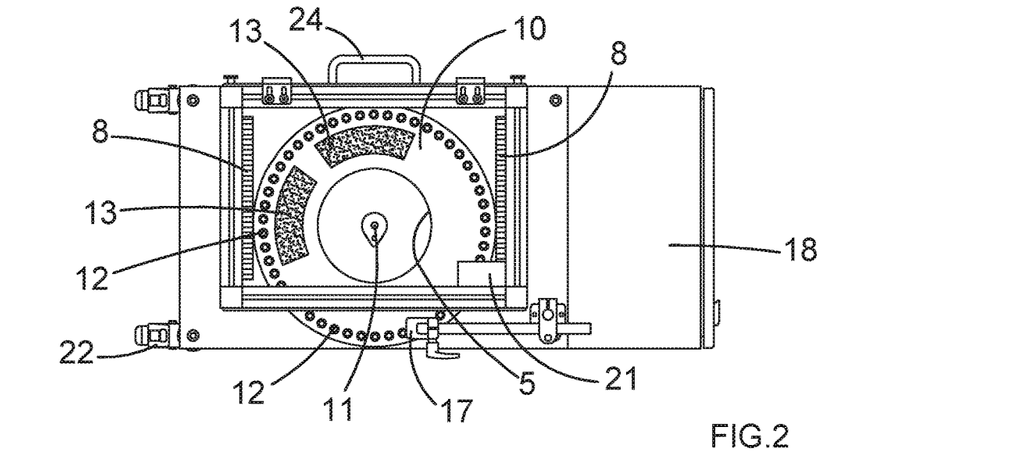
FIG. 2 shows a plan view of the apparatus shown in FIG. 1.
Figure 3:
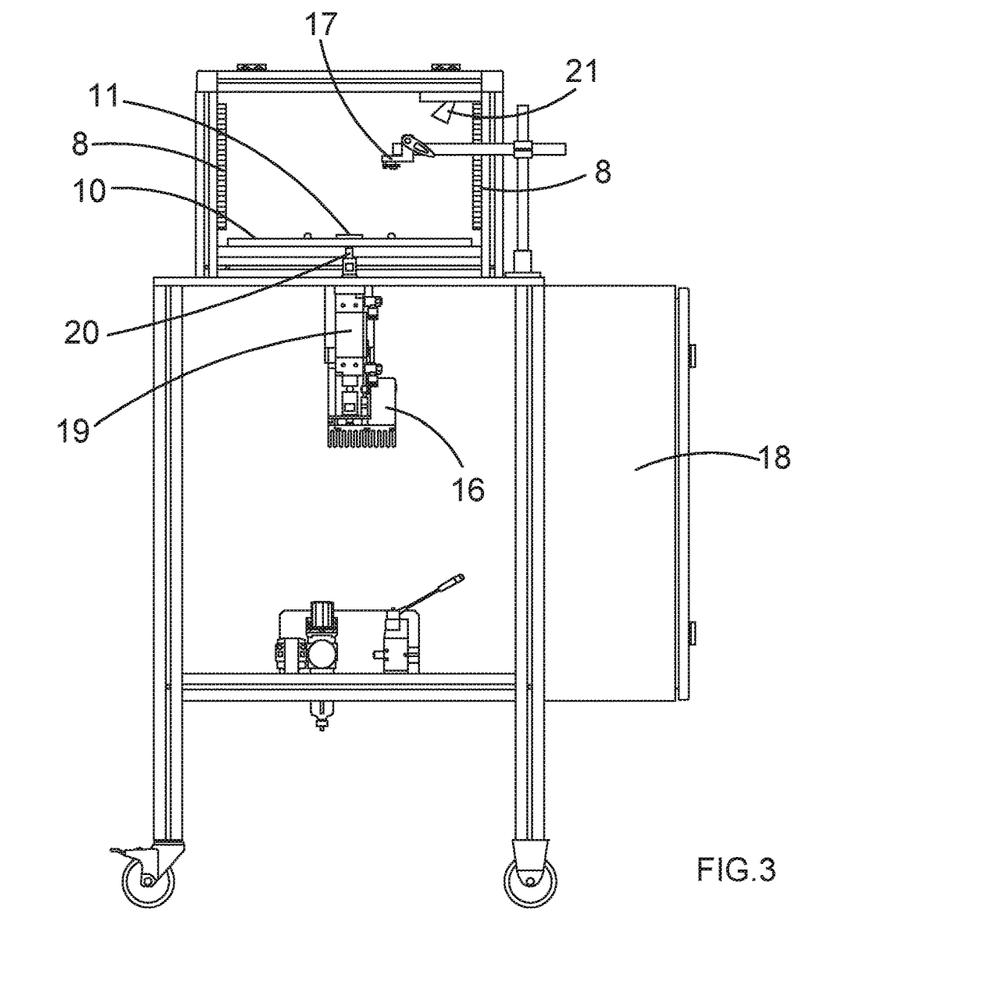
FIG. 3 shows a side view of the apparatus shown in FIG. 1.

FIGS. 1-3 show an apparatus 1 for harvesting insect eggs. The apparatus comprises a container 2 for accommodating a plurality of insects. The container is cuboid and has generally flat, transparent walls. The wall 4 is provided with a circular aperture 5. The aperture is positioned centrally in the wall, which forms a top surface of the container. The apparatus is provided with a removeable lid 6. The lid 6 is removably and sealingly engageable with the aperture 5. Tabs 7 retain the lid 6 in place when it is engaged with the aperture 5. In use, a user may remove the lid 6 from the aperture, introduce insects into the container and then replace the lid. The insects may be introduced in a separate transport container, which is only opened once the lid 6 is sealingly engaged with the aperture 5. The insects introduced into the container must comprise a female insect. If the female is not gravid the container must additionally house a suitable male.

There are mesh panels 8 attached to the interior surface of two of the sidewalls. The mesh panels are generally square and cover a high proportion of the surface area of two of the opposing sidewalls 4 of the container. The mesh is a wire mesh having a hole diameter of 1.56 mm. The wires which form the mesh have a diameter of 0.56 mm.

The container is provided with a flat and rectangular base 9. A disc shaped actuator 10 is rotatably mounted on the base. The actuator is adapted to rotate about a central axis defined by the central point of attachment 11 of the actuator to the base.

Figure 4:
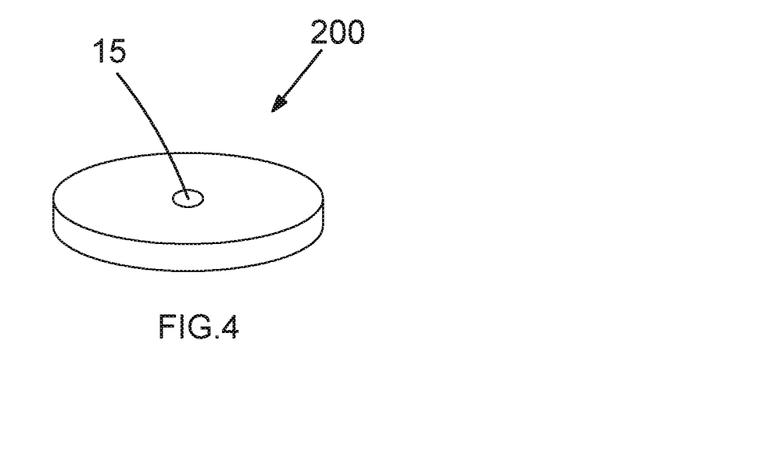
FIG. 4 shows a receiving member for use with the apparatus shown in FIG. 1.

The actuator is provided with a plurality of engaging portions 12. These engaging portions 12 are positioned in a series spaced around the circumference of the actuator. The gaps between the engaging portions 12 are constant for any two adjacent engaging portions. In use, receiving members 200 (see FIG. 4) are removably accommodated in each of the engaging portions. The receiving member 200 is shown in FIG. 4 (discussed in more detail below). The receiving members 200 are generally disc shaped and have a generally flat top surface. The top surface of each receiving member 200 is smooth. Each disc is accommodated in its own engaging portion 12 which is provided in the upper surface of the actuator. A more detailed view of the receiving member is shown in FIG. 4. The receiving members are individually removeable and replaceable from the actuator. The bottom of the engaging portion 12 is formed as a generally cylindrical recess which is provided with a ledge on which the receiving member 200 may be seated. The ledge is annular in nature and has a flat upward surface for seating the receiving member. The ledge is formed at about half height in the generally cylindrical recess which defines the engaging portion 12.

Two portions of the surface of the actuator are provided with a textured surface 13. The textured surface 13 is rougher than the upper surface of the receiving member 200.

A portion of the actuator protrudes from inside the container, through an aperture 14 in a sidewall of the container, to the outside of the container. The aperture is generally rectangular and has rigid edges. The portion of the actuator which protrudes from the container comprises a segment of the actuator. The protruding segment has plurality of the engaging portions 12 (which will each, in use, be provided with a receiving member 200).

The aperture 14 and the actuator 10 cooperate so that as the actuator rotates, no insects are able to escape from the container. The cooperation is provided by the width of the gap between the actuator and the edge of the aperture 14 which is formed in the wall of the container. The width of the gap is selected to be small enough so that insects are unable to pass through the gap. The width of the gap in this embodiment is 1 mm.

In other embodiments, the aperture 14 is provided with a sealing member which is preferably flexible and cooperates with the actuator to reduce or substantially eliminate the gap between the wall and the actuator.

The recesses (engaging portions 12) in the actuator which accommodate the receiving members 200 have a depth which allows an upper surface of the receiving member 200 to sit below the top surface of the actuator. This allows an egg located on the receiving member to sit below the top surface of the actuator. This prevents an egg from being scraped off the receiving member as the receiving member passes under the wall which defines the aperture 14.

In use, once between 1-12000 insects have been introduced into the container 2, a female insect will eventually lay an egg inside the container. The receiving members are adapted to be an attractive place for the female insects to lay an egg. This is achieved by the flat and/or smooth surface of the disc. The mesh panels 8 are adapted to deter certain insects, for example moths, from settling on the walls of the container to lay their eggs there. The function of the textured, in this embodiment rough, surface portions 13 of the actuator is generally the same as the mesh. Some insects prefer to lay their eggs on a smooth surface. They will therefore preferentially lay their eggs on the smooth and/or flat upper surface of the receiving members 200 rather than on the textured surface portions of the actuator or the mesh in the container.

The greater the coverage of the interior surfaces of the container and surfaces of the actuator by either textured (e.g. roughened) surfaces, or by a deterrent member such as a mesh (or combinations thereof), the greater the chance that an insect will lay an egg on the receiving member 200. Increasing the chance of the insect laying an egg on the receiving member increases the efficiency and speed of the process.

In other embodiments, some or all of the walls of the container are formed by a mesh or have a textured surface which forms an interior surface of the container. In some embodiments, substantially all of the interior surfaces of the container and the surfaces of the actuator are covered with a deterrent member such as a mesh or are textured.

The receiving member 200 is provided with a dose of insect attractant 15. This insect attractant becomes airborne and increases the probability of an insect laying an egg on the receiving member.

The apparatus is provided with a motor 16 for driving the rotation of the actuator 10. The motor is a variable speed motor. This allows the speed of rotation of the actuator to be adjusted depending on the frequency of egg laying inside the container. The motor is also indexable. That is, the motor may be moved accurately between successive indexed positions which correspond to the positions of the receiving members 200 on the actuator 10.

The apparatus is provided with a camera 17 for detecting whether an egg has been laid on the receiving members as they exit the container as the actuator rotates. If the camera detects that an egg is present on a receiving member it sends a signal to the control unit which is housed inside the box 18. The control unit then sends a signal to a removal device 19. The removal device 19 is provided with an actuator 20 which, on receiving a signal from the control unit, is actuated. The actuator 20 extends through an aperture in the bottom of the recess 12 in the actuator 10 which accommodates the receiving member. The actuator 20 pushes the receiving member upwardly and out of the recess 12, thereby detaching it from the actuator 10. The receiving member and the egg which it carries may then be removed by a user or by a robot for further processing.

The apparatus is provided with an air blower 21. The air blower is linked to the control unit 18 and the camera 17. The camera is adapted to detect when an insect is in the process of laying a number of eggs. The camera then sends a signal, via the control unit to the air blower. This signal activates the air blower, which directs a blast of air at the insect inside the container which is in the process of laying a number of eggs. This blast of air interrupts the insect's laying process and reduces the number of eggs which are laid on any particular receiving member, preferably so that as near as possible to a single egg is laid on the receiving member.

In use, insects are introduced into the container 2. The insects inside the container 2 will lay eggs, preferably on the receiving members. The actuator 10 rotates so that some of the receiving members which were inside the container 2 are removed from the container. Each receiving member is then analysed using the camera 17 to detect whether an egg has been laid on the receiving member. If one or more eggs is detected, the receiving member and egg(s) is/are removed using the removal device 19 and the process described above. If a receiving member with an egg is removed, it can be replaced with a fresh receiving member. If the receiving member does not have an egg deposited thereon when it is analysed by the camera, it is returned into the container 2 as the actuator 10 continues to rotate.

During the process, diet, water, waste or attractant may be added or taken away from each receiving member whilst it is outside of the container 2. This may be accomplished by hand or by a further automated actuator which responds to a signal (which is indicative of the need to add or take away one or more of the diet, water, waste or attractant), which signal is generated by the camera and passed through the control unit.

The apparatus 1 is mounted on a frame which is provided with wheels 22. The container is provided with a door which is connected to the rest of the container by hinges 23. This door allows a whole wall of the container to be swung open to provide easy access to the interior of the container 2, for cleaning. The hinged wall is provided with a handle 24.

FIG. 4 shows an enlarged view of a receiving member 200, for engagement with the engaging portions 12 shown in FIGS. 1-3. The receiving member 200 is a transparent circular disc which is made of acrylic. The depth of the receiving member is 1 mm and the diameter is 10 mm. The top surface of the receiving member is flat and smooth. The top surface is identical to the bottom surface. This means that a user does not need to identify a 'right way up' when placing the receiving member into one of the recesses 12 in the actuator 10.

A dose of attractant liquid 15 is shown in the middle of the upper surface of the disc.

In other embodiments, the upper and/or lower surfaces of the receiving member have a recess or are concave. This provides a place for diet for an insect to be accommodated, or for any other attractant to be accommodated, for example a liquid which becomes airborne to attract insects to lay eggs on the receiving member. In some embodiments the receiving member is formed as a pot, which may be a pot as described herein.

Figure 5:
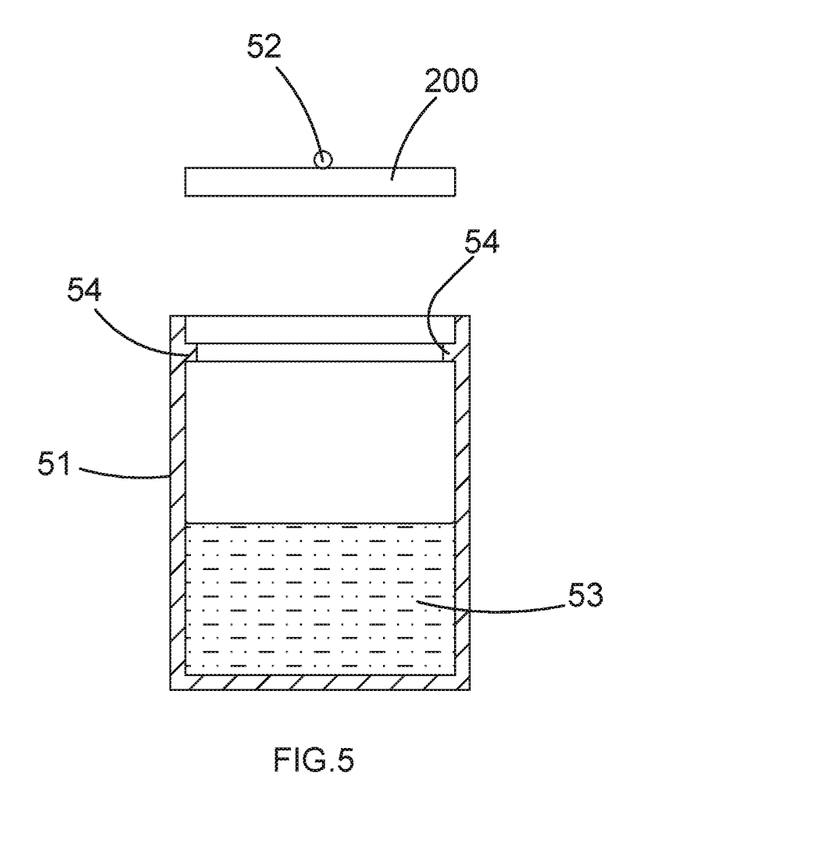
FIG. 5 shows a side cross sectional view of a pot according to the invention.

FIG. 5 shows a cross sectional view of a pot according to the invention. The pot comprises a body 51 and a receiving member 200, which is adapted to form a lid of the pot. The pot is generally cylindrical. The receiving member 200 is shown holding an egg 52. The pot contains a diet 53. In use, once the receiving member 200 and egg 52 have been removed from the apparatus 1, the receiving member is held over the pot as shown. The receiving member is then turned over, so that the egg either drops into the diet 53 or remains adhered to the underside of the receiving member. The receiving member is then lowered onto an annular rib 54 which acts as a seat for the receiving member and prevents the receiving member from falling into the diet. In this position the receiving member acts as a lid to the pot and the pot can be transported for further processing.

The receiving member is transparent. This allows a user, or an automated detection system, to see into the pot to check whether the egg has hatched, during further processing. If an egg has not hatched after a certain amount of time, the pot and its contents can be discarded. This provides an efficient process because non-hatching eggs can be disposed of early without wasting further space, time and resources on processing them.

Figure 6:
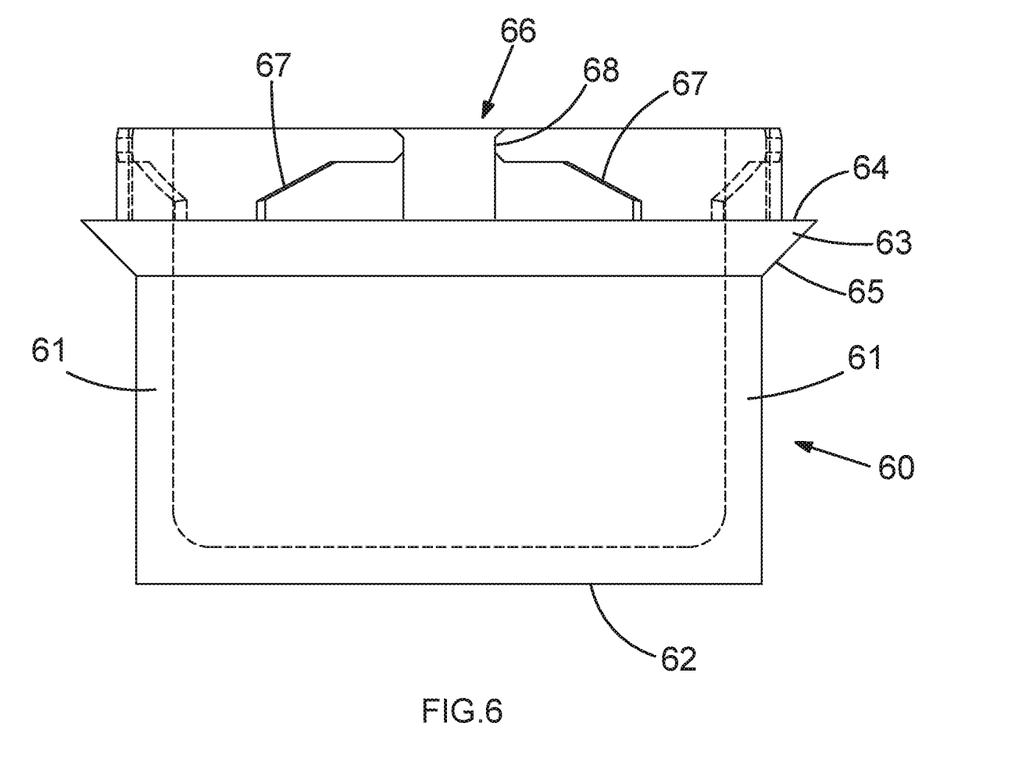
FIG. 6 shows a side view of the body of a pot according to the invention.

FIG. 6 shows a side view of the body 60 of a pot according to the invention. The body of the pot is generally the shape of a squashed cylinder. The pot has an upstanding sidewall 61 and a flat base 62. An upper portion of the pot's body is provided with an annular rib 63. The diameter of the annular rib has a straight taper 65 from its outer diameter to the sidewall 63. This is useful for seating the pot in a recess 12 if the pot is to be used as a receiving member with the apparatus according to the invention. The annular rib has a flat top 64 below the level of the top of the sidewall, which acts as a seat for a lid. The pot has an open mouth 66. Engagement means 67 are carved out of the sidewall 61 adjacent to the upper end of the pot's body 60. These engagement means cooperate with engaging means on a lid. Two options for the lid of the pot are shown in FIGS. 7 and 8.

The engaging means comprise ramps and lugs 68 with which corresponding features on a lid can engage. The engagement is secure and is sufficient to control or affect the rate of evaporation from within the pot and reduce the exposure of the contents of the pot to pathogens in the surrounding environment. In some embodiments the engagement forms a watertight and airtight engagement.

FIG. 7 shows a side cross sectional view of a lid 71 of a pot according to the invention. The lid is adapted to fit onto the pot body shown in FIG. 6. The lid is provided with protrusions 72 about its inner circumference which are adapted to engage with the engagement means 67 and 68 on the pot body shown in FIG. 6. The lid 71 is provided with a central aperture 73. The aperture is circular when viewed from above. The sides of the aperture are shaped so that the upper section of the aperture has a larger diameter than a lower section of the aperture. In the uppermost portion of the aperture, the sides of the aperture have a straight taper 74, which tapers inwardly. At the inner end of the taper, the sidewalls 75 of the aperture are straight and orientated so that the diameter of the aperture does not change. The taper 74 and the sidewalls 75 allow a user to drop a disc shaped receiving member 200, as described herein, into the taper 74. This process is described in connection with FIG. 5. The disc will settle under gravity until it rests in the straight sided portion of the aperture 75 such that it completes the lid of the pot. When the receiving member is transparent this allows a user to see into the pot to check whether an egg in the pot has hatched.

Figure 8:
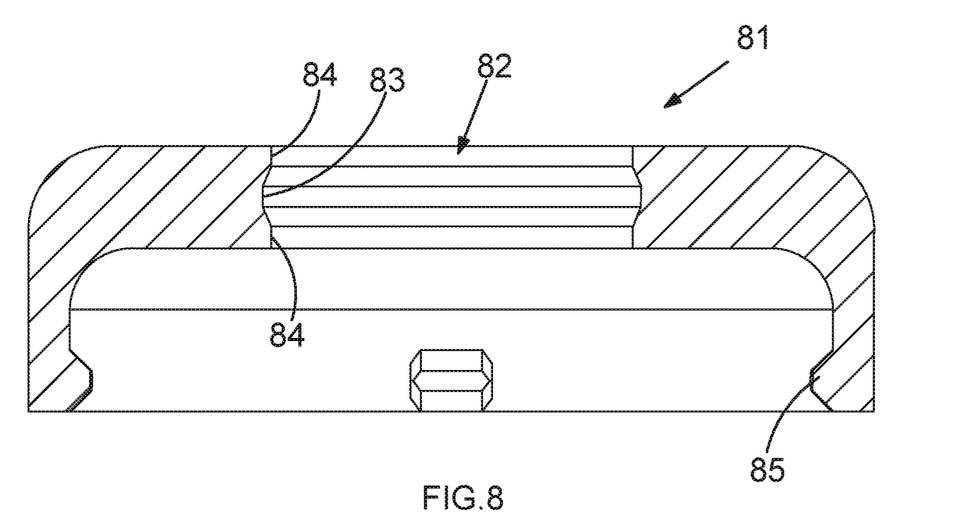
FIG. 8 shows a side cross sectional view of the lid of a pot according to the invention.

FIG. 8 shows a side cross sectional view of a lid 81 of a pot according to the invention. The lid is identical to the lid shown in FIG. 7 except that the shape of the aperture 82 is different than the shape of the aperture 73. The lid is provided with protrusions 85 about its inner circumference. The aperture has walls which define an inner portion 83 and outer portions 84, which bound upper and lower sides of the inner portion 83. At the inner portion 83, the aperture has a slightly larger diameter than at the outer portions 84. The increased diameter sidewall forms an annular groove for engaging a chimney. Such a chimney 101 is shown in FIG. 10.

Figure 9:
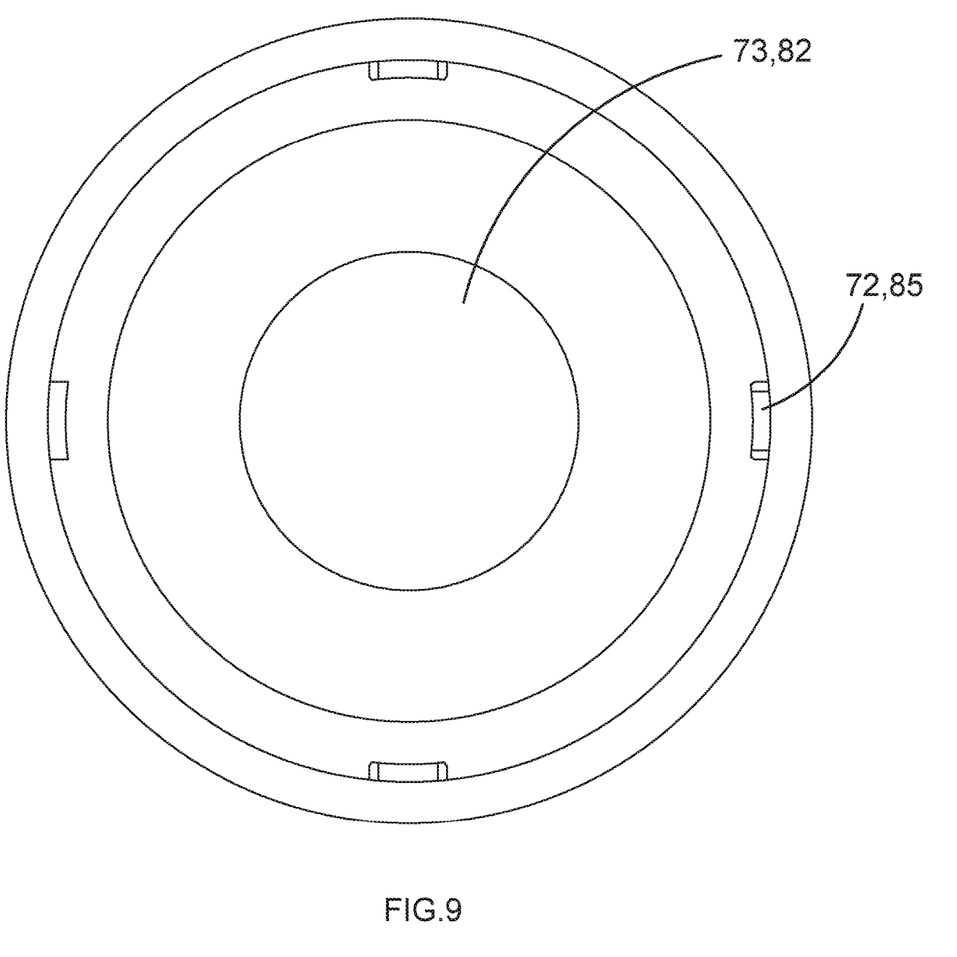
FIG. 9 shows a bottom view of the lids shown in FIGS. 7 and 8.

FIG. 9 shows a bottom view of the lids shown in FIGS. 7 and 8. The lids shown in FIGS. 7 and 8 look identical when viewed from this perspective.

The components of the pots, for example the lids and the body, are 3D printed and formed of a polymer.

Figure 10:
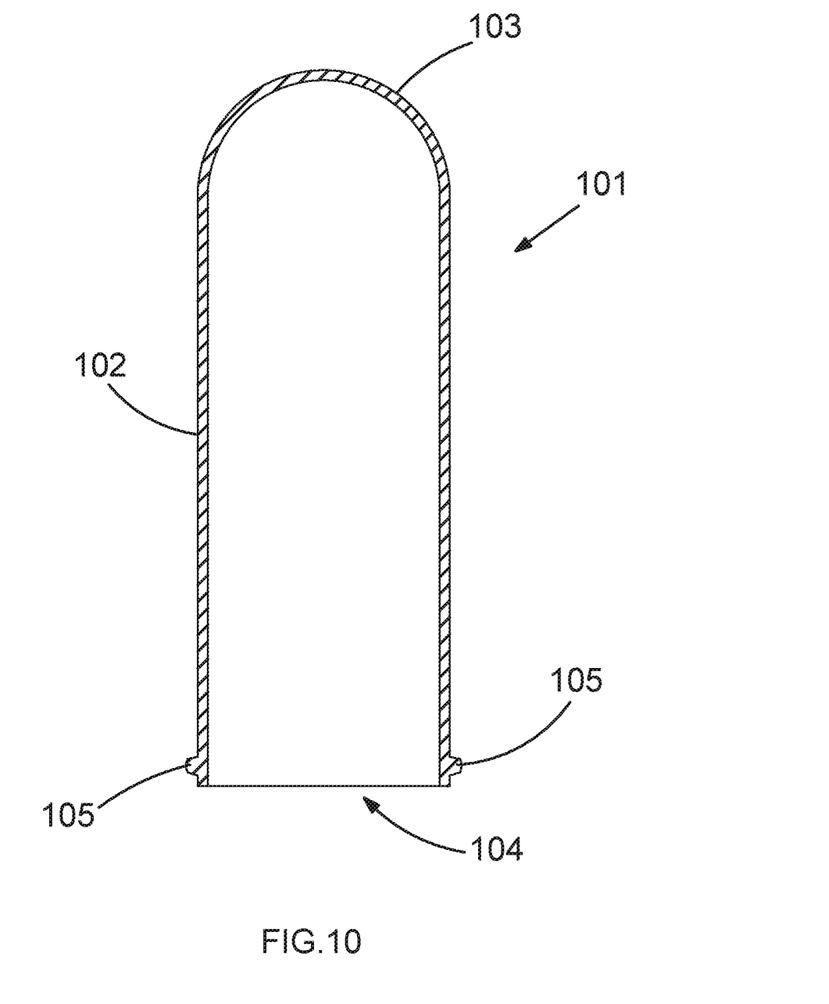
FIG. 10 shows a side cross sectional view of a chimney for use with a pot according to the invention.

FIG. 10 shows a side cross-sectional view of a chimney for use with a pot having a lid according to FIG. 8. The chimney 101 is transparent. Preferably it is made from a transparent polymer. It has the general shape of a test tube. It has a generally cylindrical body 102. At one end of the body, the sidewalls merge to form a rounded end 103. At the other end of the body, the chimney has an open circular mouth 104. The chimney is provided with an annular rib 105 near to its open end. This runs around the outside of the body 102. The rib may be formed of a deformable material.

In use, the mouth 104 of the chimney is lowered through the aperture 82 in the lid shown in FIG. 8. As the rib 105 reaches the upper section of the aperture 84, a user may push down on the chimney so that the rib 105 is forced further into the aperture 82, until is snaps into the groove formed by the larger diameter section 83 of the aperture. This snap fit between the rib 105 and the groove 83, retains the chimney in the pot so that the body 102 and the end 103 of the chimney project above the upper surface of the lid 81.

Figure 11:
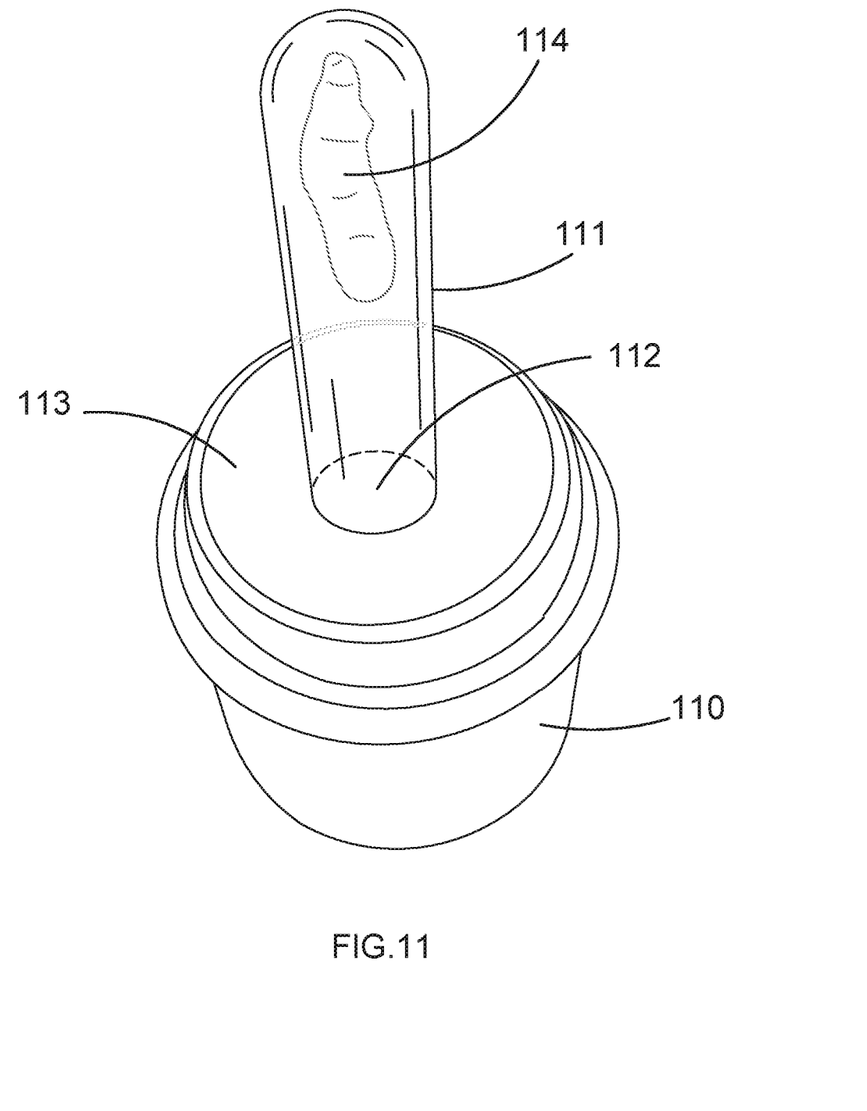
FIG. 11 shows a pot according to the invention with a chimney in place.

FIG. 11 shows a pot 110 according to the invention with a chimney 111 located in an aperture 112 in the lid 113 of the pot. The pot contains a diet for an egg. In the chimney is a larva 114, which is visible through the transparent walls of the chimney. After an egg hatches and consumes the diet contained within the pot, the fully grown larva will usually move of its own accord away from the wet diet in the pot in search of a dryer location. The chimney provides this location. The larva can transform into a pupa once it is in the chimney. The transparent nature of the chimney can show an operator at a glance, or an automated detector, that the larva has left the diet and will soon pupate. The progress of the rearing can therefore be easily monitored. The chimney may be removed from the pot, and its open end sealed, once the larva is inside to prevent it from returning to the pot and to minimise space requirements and facilitate handling. Insects which have developed sufficiently can be removed from an array without delay. This provides a more space-efficient and faster process.

The invention claimed is:

1. An apparatus for harvesting insect eggs, comprising:
   a container for containing an insect,
   a plurality of receiving members, said plurality of receiving members being independently detachable and removeable from said container,
   said receiving members being configured to receive an egg laid by the insect, and
   an actuator for removing each receiving member independently from the container, wherein, in use, as the plurality of receiving members are removed from the container, insects inside the container are not able to escape said container.

2. The apparatus according to claim 1 wherein the actuator is adapted to introduce the plurality of receiving members into the container.

3. The apparatus according to claim 1
   wherein the container is provided with a port,
   wherein the actuator is adapted to remove the plurality of receiving members from the container through the port, and
   wherein the port cooperates with the actuator or the plurality of receiving members so that insects inside the container are unable to escape the container.

4. The apparatus according to claim 3, wherein the port is formed as a rigid aperture.

5. The apparatus according to claim 3, wherein the port is formed as a slit, wherein at least one wall of the slit is flexible.

6. The apparatus according to claim 1 wherein the plurality of receiving members comprise a pot.

7. The apparatus according to claim 1 wherein the plurality of receiving members comprise a generally flat disc or has a square, rectangular, oval, or cross shape.

8. The apparatus according to claim 1 wherein the plurality of receiving members are removably engageable with an engaging portion of the actuator.

9. The apparatus according to claim 1 wherein the plurality of receiving members comprise a transparent portion.

10. The apparatus according to claim 1
    wherein the actuator and the container are adapted to rotate relative to one another and
    wherein the plurality of receiving members are located on the actuator such that,
       as the actuator rotates relative to the container, the plurality of receiving members are moved from inside the container to outside the container, and,
       as the actuator rotates further relative to the container, the plurality of receiving members are moved from outside the container to back inside the container.

11. The apparatus according to claim 10 wherein the actuator comprises a rotating disc.

12. The apparatus according to claim 10 wherein the plurality of receiving members are arranged in one or more rows which run generally parallel to an outer edge of the actuator.

13. The apparatus according to claim 10 wherein the rotation of the actuator and the container relative to one another is indexable.

14. The apparatus according to claim 1 wherein the actuator is adapted to remove more than one receiving member from the container at a same time.

15. An apparatus for harvesting insect eggs, comprising:
    a container for containing an insect;
    a plurality of receiving members which are to:
       be removably detachable from the apparatus,
       receive an egg laid by the insect, and
       be each independently removable from the container; and
    an actuator for removing each of the receiving members independently from the container;
    an automated detector for detecting whether the egg has been laid on the plurality of receiving members; and
    an intervention device for preventing the insect from laying a second egg on the plurality of receiving members on which the egg has already been laid, wherein the intervention device is adapted to interrupt an insect's egg laying process in response to a signal from the automated detector.

16. The apparatus according to claim 1 further comprising an intervention device for preventing the insect from laying a second or further egg on the plurality of receiving members on which the egg has already been laid.

17. The apparatus according to claim 15 further comprising a device for adding water or diet to the receiving members in response to the signal from the automated detector.

18. The apparatus according to claim 15 wherein the container is provided with a reclosable port for introducing insects into the container.

19. The apparatus according to claim 18 wherein the container is provided with a second reclosable port.

20. The apparatus according to claim 1 wherein a portion of a wall of the container is formed of a mesh.

21. The apparatus according to claim 1 wherein a portion of an interior surface of a wall of the container is covered by a mesh.

22. The apparatus according to claim 1 wherein a portion of an interior surface of a wall of the container is textured.

23. The apparatus according to claim 1 wherein the plurality of receiving members are provided with a recess for accommodating a diet for the insect.

24. The apparatus according to claim 1 wherein a laying surface of the plurality of receiving members is smoother than a textured interior surface of a wall of the container.

25. The apparatus according to claim 1 wherein the plurality of receiving members are provided with an insect attractant.

26. The apparatus according to claim 1 further comprising a removal device for removing the plurality of receiving members from the actuator or for removing the egg from the plurality of receiving members.

* * * * *